United States Patent
Heeter et al.

(10) Patent No.: US 11,680,524 B1
(45) Date of Patent: Jun. 20, 2023

(54) TURBINE ENGINE ACOUSTIC PANEL WITH OUTER FLANGE CASE MOUNTING

(71) Applicants: Rolls-Royce Corporation, Indianapolis, IN (US); Rolls-Royce North American Technologies Inc., Indianapolis, IN (US)

(72) Inventors: Robert W. Heeter, Noblesville, IN (US); Christopher D. Hall, Indianapolis, IN (US); Daniel E. Molnar, Jr., Lebanon, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 7 days.

(21) Appl. No.: 17/553,701

(22) Filed: Dec. 16, 2021

(51) Int. Cl.
  *F02C 7/24* (2006.01)
  *F02C 7/045* (2006.01)
  *F01D 25/24* (2006.01)

(52) U.S. Cl.
  CPC ............ *F02C 7/045* (2013.01); *F01D 25/243* (2013.01); *F05D 2250/283* (2013.01); *F05D 2260/31* (2013.01); *F05D 2260/96* (2013.01)

(58) Field of Classification Search
  CPC ........ F01D 25/24; F01D 25/243; F01D 25/04; F02C 7/045; F02C 7/24; F02K 1/827; F05D 2260/31; F05D 2260/96; B64D 33/02; B64D 2033/0213
  See application file for complete search history.

(56) References Cited

U.S. PATENT DOCUMENTS

| | | | |
|---|---|---|---|
| 6,123,170 A | 9/2000 | Porte et al. | |
| 6,382,905 B1 | 5/2002 | Czachor et al. | |
| 6,761,245 B2 | 7/2004 | Porte | |
| 6,920,958 B2 | 7/2005 | Harrison | |
| 7,503,425 B2 | 3/2009 | Strunk | |
| 7,866,939 B2 | 1/2011 | Harper et al. | |
| 7,967,108 B2 | 6/2011 | Harper | |
| 8,186,934 B2 * | 5/2012 | Humphries | F02K 1/827 415/196 |
| 8,650,853 B2 | 2/2014 | Porte et al. | |
| 8,672,609 B2 | 3/2014 | Lussier et al. | |
| 9,683,490 B2 | 6/2017 | Harper et al. | |
| 9,702,375 B2 | 7/2017 | Costa et al. | |
| 9,932,897 B2 * | 4/2018 | Riou | F02C 7/045 |
| 10,030,540 B2 * | 7/2018 | Molnar | B29C 63/0013 |
| 10,260,522 B2 | 4/2019 | Heeter et al. | |
| 10,612,564 B2 | 4/2020 | Heeter et al. | |
| 2018/0347585 A1 | 12/2018 | Unton | |
| 2020/0325851 A1 * | 10/2020 | Higbie | F01D 25/04 |

* cited by examiner

*Primary Examiner* — Eldon T Brockman
*Assistant Examiner* — Maxime M Adjagbe
(74) *Attorney, Agent, or Firm* — Barnes & Thornburg LLP (57) ABSTRACT

A gas turbine engine includes a fan case assembly adapted to extend around blades of a fan rotor included in the gas turbine engine. The fan case assembly includes an annular case that extends around an axis, an acoustic panel coupled to the annular case and configured to dampen vibrations and a bolting arrangement that couples the acoustic panel to the annular case.

20 Claims, 6 Drawing Sheets

TURBINE ENGINE ACOUSTIC PANEL WITH OUTER FLANGE CASE MOUNTING

STATEMENT REGARDING FEDERALLY SPONSORED RESEARCH OR DEVELOPMENT

Embodiments of the present disclosure were made with government support under Contract No. FA8650-19-F-2078. The government may have certain rights.

FIELD OF THE DISCLOSURE

The present disclosure relates generally to gas turbine engines, and more specifically to acoustic panels for gas turbine engines.

BACKGROUND

Gas turbine engines used in aircraft often include a fan assembly that is driven by an engine core to push air through the engine and provide thrust for the aircraft. A typical fan assembly includes a fan rotor having blades and a fan case that extends around the blades of the fan rotor. During operation, the fan blades of the fan rotor are rotated to push air through the engine. The fan case both guides the air pushed by the fan blades and provides a protective band that blocks fan blades from escaping out of the fan assembly in case of a blade-off event in which a fan blade is released from the fan rotor.

Fan cases sometimes include acoustic panels positioned near or adjacent to the rotating blades of the fan assembly. Acoustic panels are generally used to dampen noise and vibrations produced by the rotating blades during operation of the gas turbine engine. Acoustic panels may be challenging components to design with secure attachment and support but also to maximize treatment (i.e. noise dampening) area while minimizing weight and cost. Poorly secured acoustic panels may experience movement in operation which could cause fretting and wear against the case. Some attachment schemes may reduce noise attenuation and flutter margin by decreasing effective area while others may increase the weight of the acoustic panel with a number of bolts and fillers. Accordingly, methods and apparatuses for mounting and forming acoustic panels for fan rotors remains an area of interest.

SUMMARY

The present disclosure may comprise one or more of the following features and combinations thereof.

According to a first aspect of the present disclosure, a fan case assembly is adapted to extend around blades of a fan rotor included in a gas turbine engine. The fan case assembly includes an annular case, an acoustic panel, and a bolting arrangement. The annular case extends around an axis and has an inner radial surface and an outer radial surface opposite the inner radial surface and facing away from the axis. The acoustic panel is coupled to the annular case and configured to dampen vibrations. The acoustic panel extends circumferentially at least partway about the axis and includes a panel body and a forward attachment flange. The panel body includes an outer body section having a first axial length and an inner body section having a second axial length greater than the first axial length. The forward attachment flange extends axially away from the outer body section of the panel body to provide a radially intermediate surface between an outer surface of the outer body section and an inner surface of the inner body section and to form a cavity radially between the forward attachment flange and the inner body section of the panel body.

In some embodiments, the bolting arrangement couples the acoustic panel to the annular case. The bolting arrangement includes a first captured nut and a first attachment fastener. The first captured nut may be fixed to the radially intermediate surface of the forward attachment flange and located in the cavity. The first attachment fastener extends radially through the outer radial surface of the annular case, the inner radial surface of the annular case, through the forward attachment flange, and mates with the first captured nut in the cavity to couple the acoustic panel with the annular case.

In some embodiments, the forward attachment flange has a first radial thickness and the inner body section has a second radial thickness greater than the first radial thickness. In some embodiments, the outer body section has a third radial thickness greater than the first radial thickness and equal to or less than the second radial thickness.

In some embodiments, the first attachment fastener has a radially outer end positioned radially outward of the annular case and a radially inner end positioned in the cavity. In some embodiments, the inner body section is formed without any attachment through holes such that no fasteners extend through the inner body section.

In some embodiments, the outer body section is formed without any attachment through holes such that no fasteners extend into the outer body section. In some embodiments, the cavity is formed in a forward end of the acoustic panel and opens in an axially-forward direction. In some embodiments, the first captured nut is a riveted nutplate that is fixed to a radially inner surface of the forward attachment flange.

In some embodiments, the acoustic panel further includes an aft attachment flange coupled to an aft end of the outer body section and arranged to lie radially between the annular case and the inner body section. The aft attachment flange cooperates with the inner body section to define a second cavity radially between the aft attachment flange and the inner body section and located axially aft of outer body section. In some embodiments, the bolting arrangement further includes a second captured nut fixed to the aft attachment flange and a second attachment fastener that extends radially through the outer radial surface of the annular case, the inner radial surface of the annular case, and into the second cavity to mate with the second captured nut.

In some embodiments, the fan case assembly further includes a seal positioned axially between an aft end of the inner body section and the annular case.

According to another aspect of the present disclosure, a fan case assembly includes an annular case that extends around an axis, an acoustic panel coupled to the annular case and configured to dampen vibrations, anda bolting arrangement that couples the acoustic panel to the annular case. The acoustic panel extends circumferentially at least partway about the axis and includes a panel body and an attachment flange. The panel body includes an outer body section and an inner body section. The attachment flange extends axially away from the outer body section of the panel body and is spaced apart radially from the inner body section to define a cavity radially between the attachment flange and the inner body section of the panel body.

In some embodiments, the bolting arrangement includes a first captured nut and a first attachment fastener. The first captured nut may be positioned between the attachment flange and the inner body section in the cavity. The first attachment fastener may extend radially through the annular case, through the attachment flange, and mate with the first captured nut in the cavity to couple the acoustic panel with the annular case.

In some embodiments, the attachment flange has a first radial thickness and the inner body section has a second radial thickness greater than the first radial thickness. In some embodiments, the outer body section has a third radial thickness greater than the first radial thickness and equal to or less than the second radial thickness.

In some embodiments, the first attachment fastener has a radially outer end positioned radially outward of the annular case and a radially inner end positioned in the cavity. In some embodiments, the inner body section is formed without any attachment through holes such that no fasteners extend through the inner body section. In some embodiments, the outer body section is formed without any attachment through holes such that no fasteners extend into the outer body section.

In some embodiments, the cavity is formed in a forward end of the acoustic panel and opens in an axially-forward direction. In some embodiments, the first captured nut is a riveted nutplate that is fixed to a radially inner surface of the attachment flange.

In some embodiments, the attachment flange is a forward attachment flange coupled to a forward end of the outer body section and the acoustic panel further includes an aft attachment flange coupled to an aft end of the outer body section and arranged to lie radially between the annular case and the inner body section, the aft attachment flange cooperating with the inner body section to define a second cavity radially between the aft attachment flange and the inner body section and located axially aft of outer body section, and wherein the bolting arrangement further includes a second captured nut fixed to the aft attachment flange and a second attachment fastener that extends radially through the outer radial surface of the annular case, the inner radial surface of the annular case, and into the second cavity to mate with the second captured nut.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
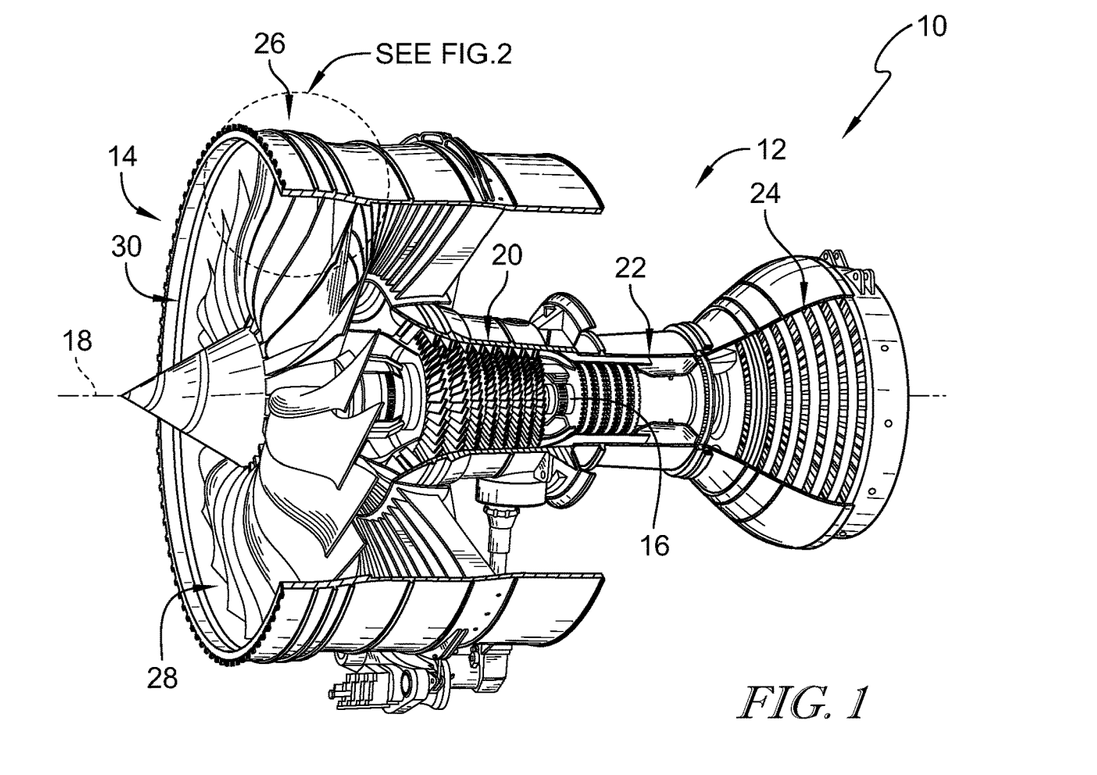
FIG. 1 is a cutaway view of a gas turbine engine that includes a fan, a compressor, a combustor, and a turbine, the fan including a fan rotor having a plurality of fan blades configured to rotate about an axis of the engine and a fan case assembly that surrounds the fan blades included in the fan rotor and showing that the fan case assembly includes an annular case and a front acoustic panel coupled to the annular case to dampen vibrations produced by the fan blades during operation of the gas turbine engine.

A gas turbine engine 10 in accordance with the present disclosure is shown in FIG. 1 and includes an engine core 12 and a fan 14 arranged upstream of the engine core 12. The engine core 12 is configured to compress and combust air entering the gas turbine engine 10 to drive rotation of one or more shafts 16 about a rotation axis 18 of the gas turbine engine 10. The one or more shafts 16 interconnect the engine core 12 and the fan 14 to cause rotation of the fan 14 and to provide thrust for the gas turbine engine 10.

The engine core 12 includes a compressor 20, a combustor 22, and a turbine 24. The compressor 20 includes one or more stages of rotating blades that compress air entering the engine core 12 and produce pressurized air which is transferred downstream to the combustor 22. The combustor is configured to mix fuel with the pressurized air and combust the fuel and pressurized air to produce combustion products which are transferred downstream to the turbine 24. The turbine 24 also includes one or more stages of rotating blades which are coupled to the one or more shafts 16 and are driven in rotation about the axis 18. Rotation of the one or more shafts 16 causes rotating components of the fan 14 to rotate about the axis 18.

The fan 14 includes a fan case assembly 26 extending circumferentially around the axis 18 and a plurality of rotating blades 28 spaced radially inward of the fan case assembly 26 as shown in FIG. 1. The fan case assembly 26 provides an outer boundary of a flowpath 30 into the gas turbine engine 10 and is arranged to lie adjacent the plurality of rotating blades 28. The plurality of rotating blades 28 are coupled to at least one of the one or more shafts 16 for rotation therewith about the axis 18. During operation, radial tips of the plurality of rotating blades 28 interface with portions of the fan case assembly 26. Interaction between the fan case assembly 26 and the radial tips of the plurality of rotating blades 28 is configured to minimize pressure losses and increase efficiencies of the gas turbine engine 10.

Figure 2:
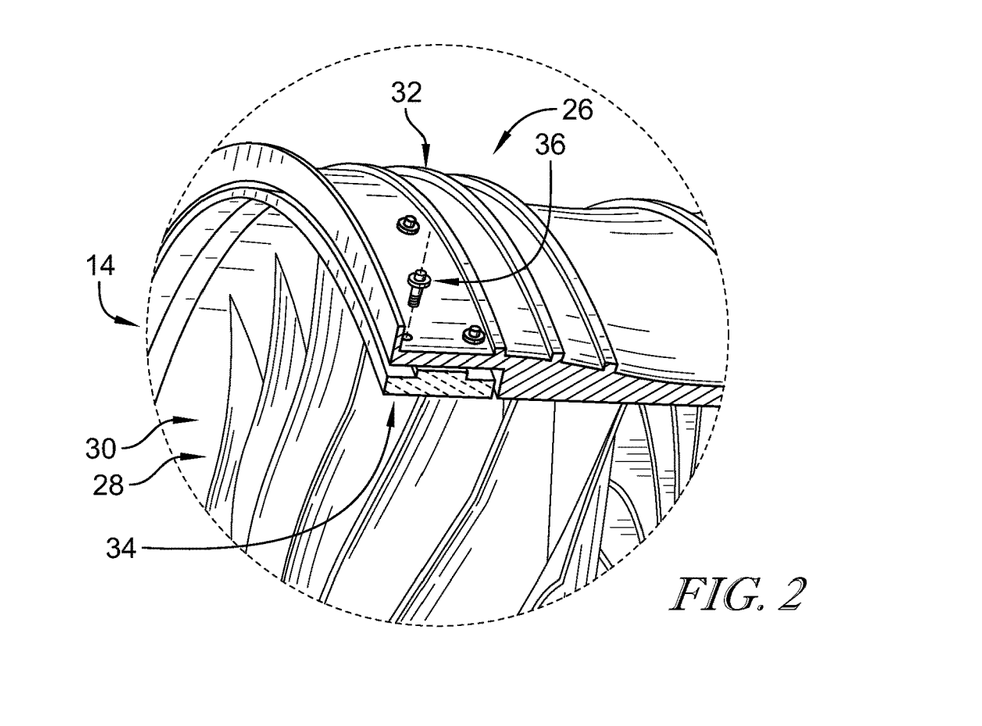
FIG. 2 is an enlarged view of a portion of the fan case assembly of FIG. 1 with portions exploded away showing that the fan case assembly further includes a bolting arrangement including a first captured nut arranged to lie within a cavity defined by the acoustic panel and a first attachment that extends radially through the annular case and into the cavity defined by the acoustic panel from radially outside the gas turbine engine to facilitate installation of the acoustic panel on the annular case and removal of the acoustic panel from the annular case for service or replacement.

The fan case assembly 26 is fixed relative to the plurality of blades 28 and includes an annular case 32, a front acoustic panel 34 supported by the annular case 32, and a bolting arrangement 36 configured to secure the acoustic panel 34 to the annular case 32 as shown in FIG. 2. The annular case 32 extends circumferentially about the axis 18 of the gas turbine engine 10. The acoustic panel 34 also extends circumferentially around the axis 18 and may form a full hoop or a plurality of circumferentially spaced segments at or near radial tips of the plurality of blades 28. The acoustic panel 34 is located radially inward of at least a portion of the annular case 32 and is offset axially forward of the plurality of blades 28 at an inlet end of the gas turbine engine 10. In some embodiments, the acoustic panel 34 is a rear acoustic panel that is mounted to the annular case and located axially aft of the plurality of blades 28. The bolting arrangement 36 couples the acoustic panel 34 to the annular case 32 in a way that facilitates assembly of the fan case assembly 26 while minimizing obstructions in the flowpath 30.

Figure 3:
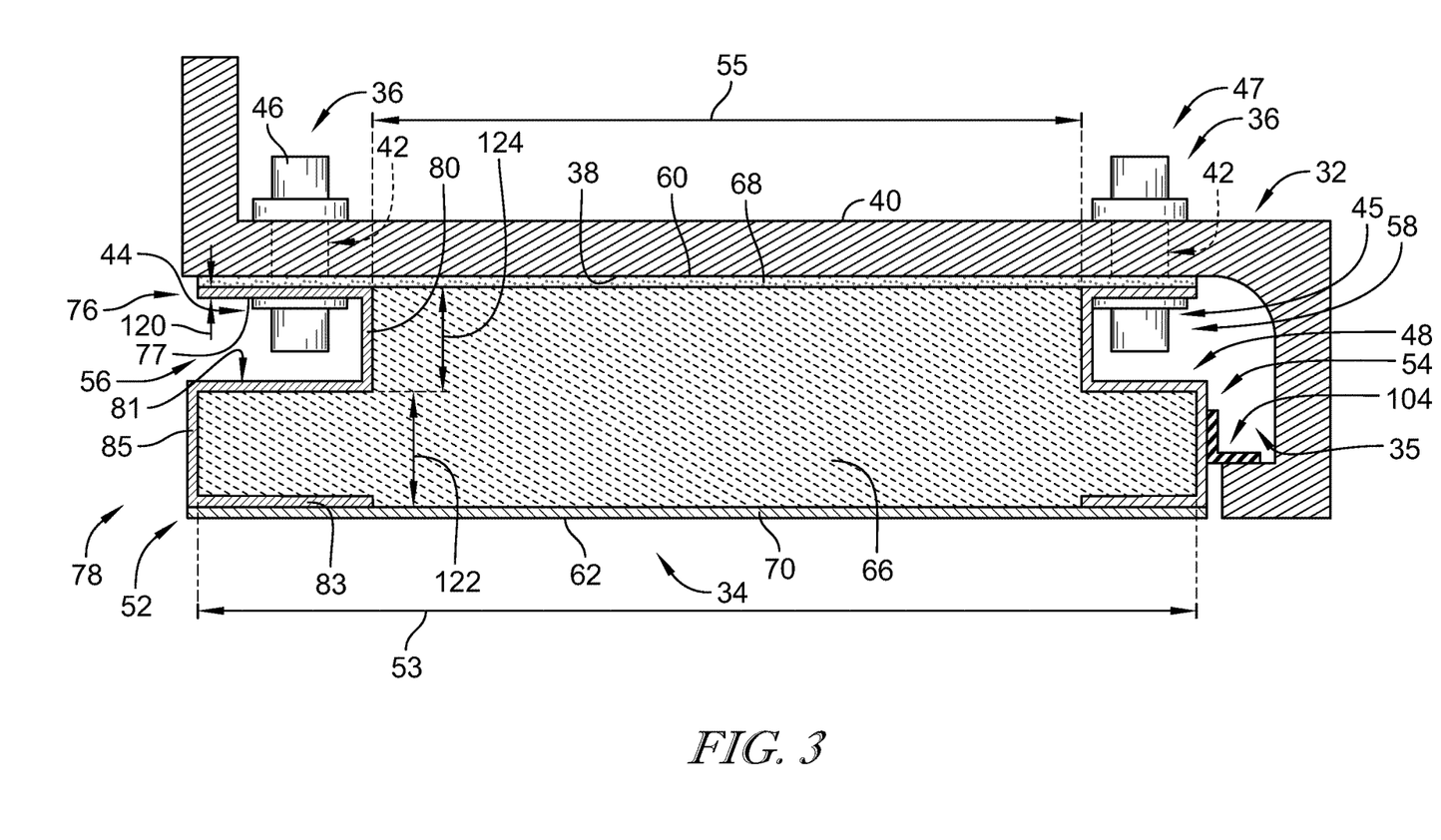
FIG. 3 is a cross-sectional view of the fan case assembly showing that the acoustic panel includes a panel body, a forward support bracket that defines the cavity at a forward end of the panel body, and an aft support bracket that defines a second cavity at an aft end of the panel body and that is configured to receive a second captured nut and a second attachment fastener that extends through the annular case and into the second cavity to retain the aft end of the acoustic panel to the annular case.

The annular case 32 has an inner radial surface 38 and an outer radial surface 40 opposite the inner radial surface 38 and facing away from the axis 18 as shown in FIGS. 2 and 3. The annular case 32 is formed to include at least one aperture or passageway 42 that extends all the way through the annular case 32 from the outer radial surface 40 to the inner radial surface 38. The annular case 32 may be formed to include a channel 35 that opens and faces toward axis 18. The acoustic panel 34 is arranged to lie within the channel 35 and is retained in the channel 35 by the bolting arrangement 36.

The bolting arrangement 36 includes at least one captured nut 44 (also called a retainer) coupled to the acoustic panel 34 and at least one corresponding attachment fastener 46 coupled to the annular case 32 as shown in FIGS. 2 and 3. The captured nut 44 is fixed to the acoustic panel 34 and is configured to receive the attachment fastener 46. The attachment fastener 46 extends through the aperture 42 from outside the flowpath 30 and is received in the captured nut 44 to secure the acoustic panel 34 to the annular case 32.

Figure 4:
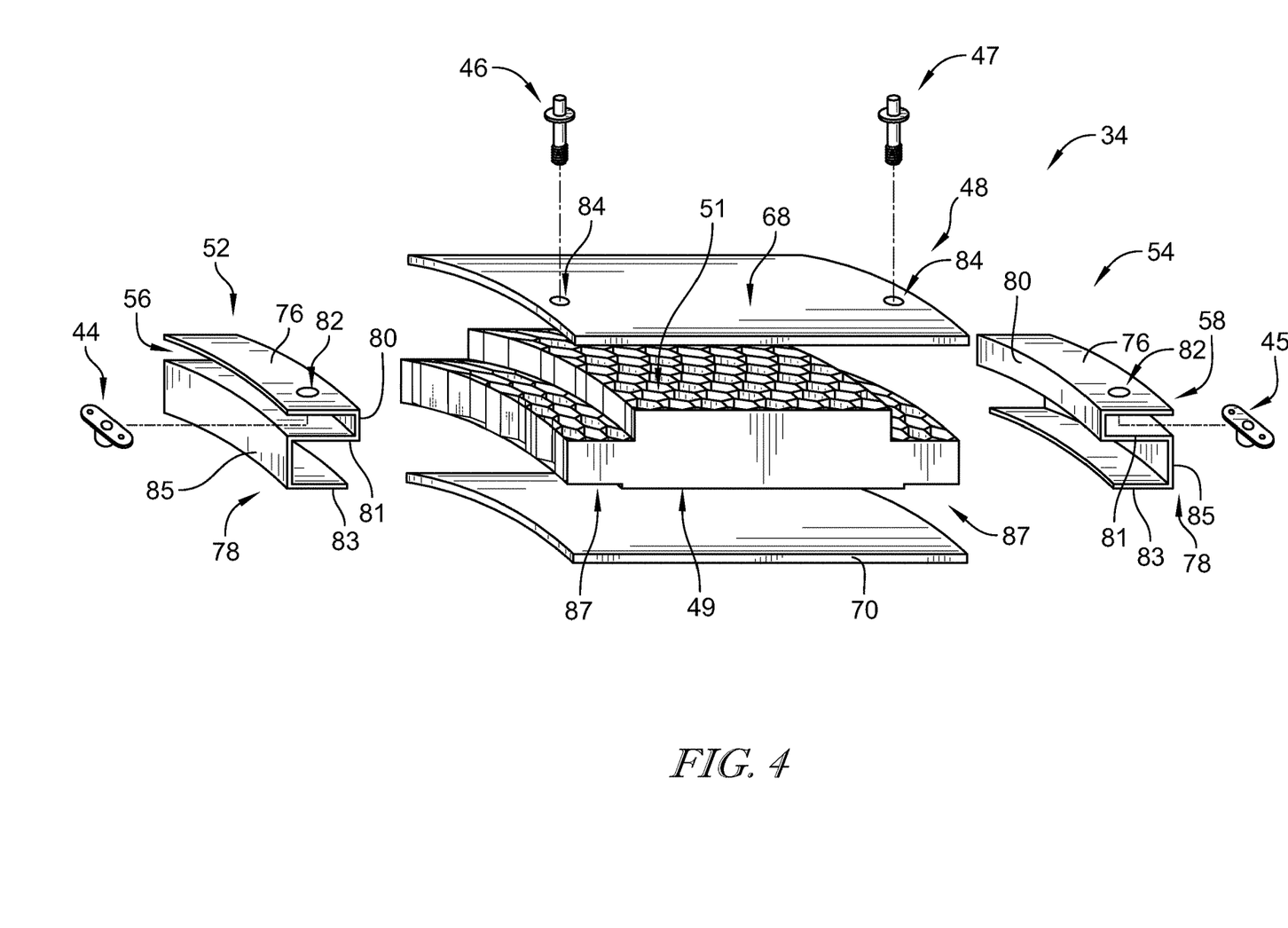
FIG. 4 is an exploded assembly view of the acoustic panel from FIG. 3 showing that the panel body includes a panel core and inner and outer skins coupled to the forward and aft support brackets to locate the forward and aft support brackets radially between the inner and outer skins and axially forward of and aft of the panel core, respectively.

The acoustic panel 34 is configured to dampen noise and vibrations caused by the plurality of blades 28 or other parts of the gas turbine engine 10. The acoustic panel 34 includes a panel body 48 and one or more support brackets 52 coupled to the panel body 48 as shown in FIGS. 3 and 4. The panel body 48 is at least partially formed from an aluminum honeycomb material and is positioned radially inward of the annular case 32 to partially define the flowpath 30. The support bracket 52 is coupled to an axially-forward and/or axial aft end of the panel body 48 and supports the captured nut 44 relative to the panel body 48 for receipt of the attachment fastener 46. The support bracket 52 also increase rigidity of the acoustic panel 34 to increase support provided by the bolting arrangement 36.

The panel body 48 includes an inner body section 49 and an outer body section 51 as shown in FIG. 3. The inner body section 49 has a first axial length 53 and the outer body section 51 has a second axial length 55 that is less than the first axial length 53. The at least one support bracket 52 includes or provides a flange 76 that is coupled to the outer body section 51 and extends in an axial direction away from the outer body section 51. The flange 76 is spaced apart from the inner body section 49 to provide a cavity 56 radially between the flange 76 and the inner body section 49. The captured nut 44 is coupled to a radially intermediate surface 77 of the flange 76 and is arranged to lie in the cavity 56 to locate the captured nut 44 between the flange 76 and the inner body section 49 and to locate the inner body section 49 between the captured nut 44 and the flowpath 30.

In some embodiments, the attachment flange 76 has a first radial thickness 120 and the inner body section 49 has a second radial thickness 122 greater than the first radial thickness 120 as shown in FIG. 3. The outer body section 51 may have a third radial thickness 124 greater than the first radial thickness 120 and equal to or less than the second radial thickness 122. The inner body section 49 may be formed without any attachment through holes such that no fasteners (i.e. attachment fastener 46) extend through the inner body section 49. The outer body section 51 may be formed without any through holes such that no fasteners (i.e. attachment fastener 46) extend into the outer body section 51.

In the illustrative embodiment, the acoustic panel 34 includes both forward and aft support brackets 52, 54 that each receive corresponding captured nuts 44, 45 and attachment fasteners 46, 47 as shown in FIGS. 2-4. Each support bracket 52, 54 at least partially defines a cavity 56, 58 that is spaced apart from the flowpath 30. The cavities 56, 58 are located radially between a radially outer surface 60 of the panel body 48 and a radially inner surface 62 of the panel body 48. All portions of the captured nuts 44, 45 and the attachment fasteners 46, 47 are spaced apart from the flowpath 30 and the radially inner surface 62 of the panel body 48. No portions of the captured nuts 44, 45 and the attachment fasteners 46, 47 protrude into or define the flowpath 30. The radially inner surface 62 of the panel body 48 may be aligned with flowpath surfaces of the annular case 32 to provide a continuous flowpath surface defining the flowpath 30. One or more seals or filler material may be located axially between the acoustic panel 34 and the annular case 32 to fill any gaps therebetween.

Figure 5:
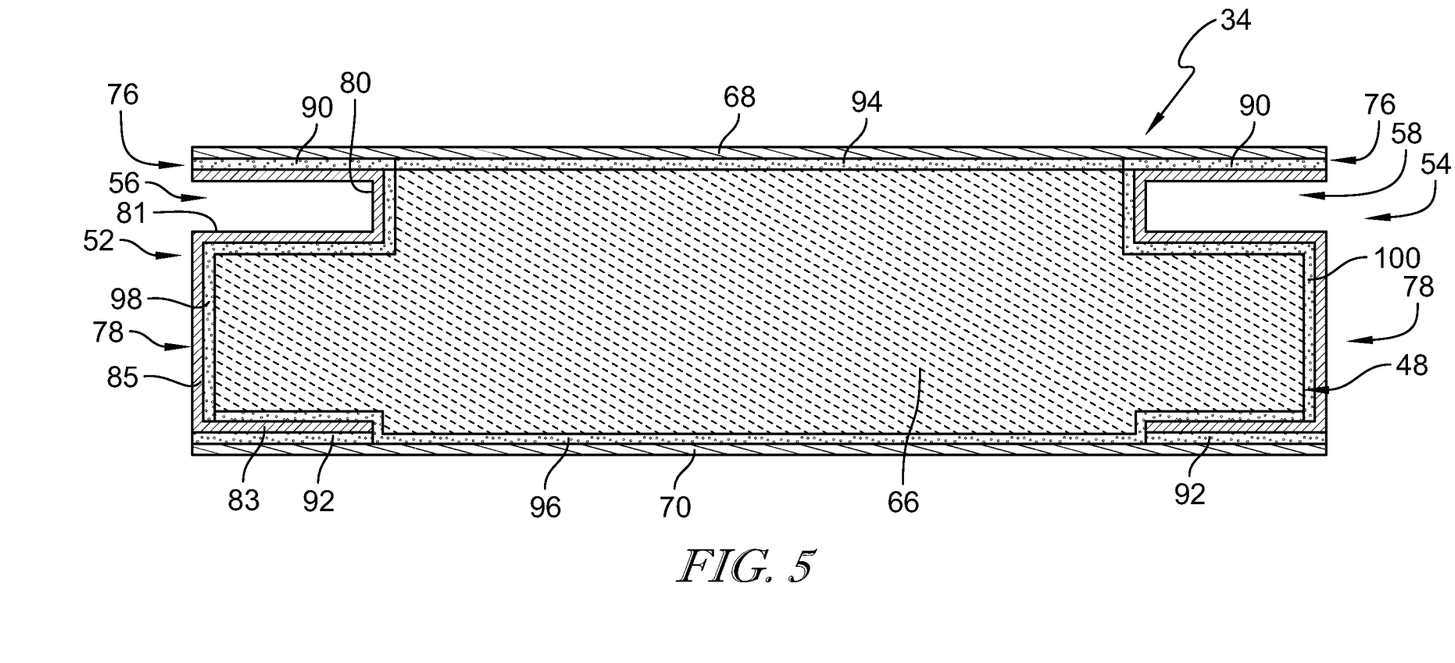
FIG. 5 is a cross-sectional view of the acoustic panel showing that the acoustic panel further includes an adhesive assembly configured to join portions of the panel body and the forward and aft support brackets to one another to form a composite acoustic panel assembly that forms the acoustic panel shown in FIGS. 2-4.

In some embodiments, all or portions of the acoustic panel 34 may be made from a plurality of separate components that are adhered together to form a composite acoustic panel 34 as suggested in FIGS. 4 and 5. The panel body 48 may include a panel core 66 and laminates or a core cover having a radially outer skin 68 coupled to an outer surface of the panel core 66 and a radially inner skin 70 coupled to an inner surface of the panel core 66. The panel core 66 may be made from an aluminum honeycomb material that dampens vibrations produced by the plurality of blades 28 during operation of the gas turbine engine 10. The aluminum honeycomb material includes a plurality of hexagonally-shaped cells or other polygon-shaped cells (i.e. Flex-Core® shaped cells) that define voids in the panel core 66. The radially inner skin 70 may have holes or apertures drilled, machined, and/or formed to extend radially through the inner skin 70 to expose portions of the panel core 66 and increase vibration dampening capabilities of the acoustic panel 34. The inner most portions 83 of the brackets 52, 54 may also include perforations.

The radially outer skin 68 and the radially inner skin 70 each have a length that is greater than the outer body section 51 and partially couple to both the forward support bracket 52 and the aft support bracket 54. In some embodiments, forward and/or aft portions of the skins 68, 70 provide part of the forward and/or aft support bracket 52, 54 to form flanges 76. In some embodiments the radially inner skin 70 has a greater radial thickness than the radially outer skin 68 to provide greater durability on the flowpath side of the acoustic panel 34.

The radially outer skin 68 and the radially inner skin 70 may each include a glass-reinforced polymer ply or layer that increases strength and stiffness of the acoustic panel 34. The plurality of glass-reinforced polymer plies or layers are stacked radially on top of one another. The plurality of glass-reinforced layers may be adhered to the forward and/or aft support brackets 52, 54 to form the flanges 76 with the support brackets 52, 54. In the illustrative embodiment, each support bracket 52, 54 is made from one or more glass-reinforced polymer plies or layers. In other embodiments, another suitable material may be used to form the support brackets 52, 54 such as a carbon-reinforced polymer, for example. In other embodiments, another suitable material may be used to form radially outer and inner skins 68, 70 and the support brackets 52, 54 such as a carbon-reinforced polymer and high modulus polypropylene, for example.

The forward support bracket 52 is coupled to a forward end of the panel core 66 and is arranged to lie radially between the radially outer skin 68 and the radially inner skin 70. The forward support bracket 52 at least partially defines the cavity 56 radially between the radially outer skin 68 and the radially inner skin 70. The cavity 56 is located axially forward of the panel core 66 and is open in a forward or upstream direction to receive the captured nut 44 during assembly.

The aft support bracket 54 is similarly shaped compared to the forward support bracket 52 except that the second cavity 58 defined by the aft support bracket 54 opens in a rearward or downstream direction opposite the first cavity 56. Accordingly, only the forward support bracket 52 is described below and the disclosure of the forward support bracket 52 is incorporated by reference for the aft support bracket 54. Similar reference numbers are used to reference common features between the forward support bracket 52 and the aft support bracket 54.

The forward support bracket 52 includes an attachment flange 76 coupled the outer body section 51 and a panel-body support 78 coupled to the inner body section 49 as shown in FIGS. 3 and 4. The attachment flange 76 is coupled to an outer end of the outer body section 51 and has a radially intermediate surface 77 that faces toward at least a portion of the panel-body support 78. The captured nut 44 is mounted directly on the radially intermediate surface 77 of the attachment flange 76. In some embodiments, the attachment flange 76 also includes portions of the radially outer skin 68. The panel-body support 78 may be coupled to the attachment flange 76 directly or indirectly and is coupled to the inner body section 49 to transfer loads from the panel body 48 to the attachment flange 76 and the bolting arrangement 36.

The attachment flange 76 extends axially away from the outer body section 51 and has the radially intermediate surface 77. The attachment flange 76 may be coupled to the radially outer skin 68. Alternatively, the radially outer skin 68 may stop short of the attachment flange 76 such that the attachment flange 76 alone supports the acoustic panel 34 on the annular case 32.

The panel-body support 78 includes an outer radially extending strip 80 coupled to the attachment flange 76, an outer axially-extending strip 81, an inner radially-extending strip 83, and an inner radially-extending strip 85 interconnecting the outer and inner axially extending strips 81, 83 as shown in FIGS. 3 and 4. The outer radially-extending strip 80 is coupled to the outer body section 51 and extends between and interconnects the attachment flange 76 and the outer axially-extending strip 81. The outer and inner axially-extending strips 81, 83 are spaced radially from one another to locate a portion of the inner body section 49 radially there between. The inner radially-extending strip 85 is arranged at an axial end of the inner body section 49 and extends radially between axial ends of the outer and inner axially-extending strips 81, 83. The attachment flange 76 is arranged radially outward of the outer axially-extending strip 81 of the panel-body support 78 to define the cavity 56, 58 radially between the attachment flange 76 and the outer axially-extending strip 81.

The panel core 66 may be formed to include a cutout 87 in an radially inner end of the inner body section 49 as shown in FIGS. 3 and 4. The inner axially-extending strip 83 is sized to fit in the cutout 87 such that the inner axially-extending strip 83 is flush with a radially inner surface of the panel core 66. The radially inner skin 70 may then be attached to the inner axially extending-strip 83 and the panel core 66. In some embodiments, inner axially-extending strip 83 and the cutouts 87 may be omitted.

The attachment flange 76 is formed or machined later to include an aperture 82 or passageway that is aligned with aperture 42 in annular case 32. The captured nuts 44, 45 are coupled to a corresponding attachment flange 76 and are aligned with a corresponding aperture 82 to receive a corresponding attachment fastener 46, 47 passing through apertures 42, 82 to secure the acoustic panel 34 to the annular case 32. The radially outer skin 68 may at least partially overlie the attachment flange 76 to reinforce the forward and/or aft support bracket 52, 54 and may be formed or machined to include an aperture 84 that is aligned with the aperture 82 formed in the attachment flange 76 when fully assembled.

The captured nuts 44, 45 are each fixed to a radially inner surface of each corresponding attachment flange 76 as shown in FIGS. 3 and 4. In the illustrative embodiment, each captured nut 44, 45 is a riveted nut plate that is coupled to the corresponding attachment flange 76 by fasteners or adhesives to at least temporarily retain the captured nut 44, 45 in place prior to receiving the attachment fastener 46, 47. Each attachment fastener 46, 47 may be a bolt or another similar fastener having a length sufficient to reach the captured nut 44, 45 from radially outward of the annular case 32. Each captured nut 44, 45 and attachment fastener 46, 47 has complementary threads that interlock when fully assembled to secure the acoustic panel 34 to the annular case 32.

The acoustic panel 34 further includes a plurality of adhesive layers that join the panel body 48 to the forward and aft support brackets 52, 54 as shown in FIG. 5. Each of the adhesive layers are shown with exaggerated thicknesses in FIG. 5 to illustrate their location in acoustic panel 34, but it should be appreciated that the thicknesses of each adhesive layer may vary relative to one another and relative to each component of the panel body 48 and the support brackets 52, 54.

The attachment flange 76 of the support brackets 52, 54 are bonded to the radially outer skin 68 by a first supported adhesive layer 90 as shown in FIG. 5. The panel-body support 78 of the support brackets 52, 54 are bonded to the radially inner skin 70 by a second supported adhesive 92. Loads acting on the acoustic panel 34 are transferred from the radially inner skin 70, through the support brackets 52, 54 to the radially outer skin 68 and the bolting arrangement 36 due to the support brackets 52, 54 being bonded to the radially outer and inner skins 68, 70. The first and second supported adhesive layers 90, 92 include a carrier and an adhesive resin carried by the carrier. The supported adhesive layers 90, 92 are a medium weight supported film adhesive in the illustrative embodiment, however, in other embodiments, other types of adhesives can be used.

The panel core 66 is bonded to the radially outer skin 68 by a first layer of unsupported adhesive 94 and to the radially inner skin 70 by a second layer of unsupported adhesive 96 as shown in FIG. 5. Each unsupported adhesive 94, 96 is may be reticulated or non-reticulated and includes and/or consists of an adhesive resin. The unsupported adhesive layers 94, 96 may also bond the panel core 66 to the inner axially-extending strip 83 of each support bracket 52, 54.

Each support bracket 52, 54 is bonded to the panel core 66 by a layer of foamed adhesive 98, 100 as shown in FIG. 5. Each layer of foamed adhesive 98, 100 is arranged to lie axially between the panel core 66 and the corresponding support bracket 52, 54. The foamed adhesive 98, 100 is configured to expand upon curing and is configured to extend into and fill voids in the panel core 66 to minimize air gaps between the support brackets 52, 54 and the panel core 66. The foamed adhesive 98, 100 may be a foaming film adhesive or an epoxy foaming filler, for example.

In some embodiments, the fan case assembly 26 may further include a seal 104 positioned axially between an aft end of the acoustic panel 34 and the annular case 32 as shown in FIG. 3. In the illustrative embodiment, the seal 104 is a flap seals that are coupled to the acoustic panel 34 and are self-biasing into engagement with annular case 32 to seal between the acoustic panel 34 and the annular case 32 near the flowpath 30. Another similar seal may be included between a forward end of the acoustic panel 34 and the annular case 32 if a portion of the annular case 32 lies in front of the acoustic panel 34 (such as for a rear panel). Other types of seals may also be used in place of the flap seal 104 such as a rope seal or a bulb seal.

Figure 6:
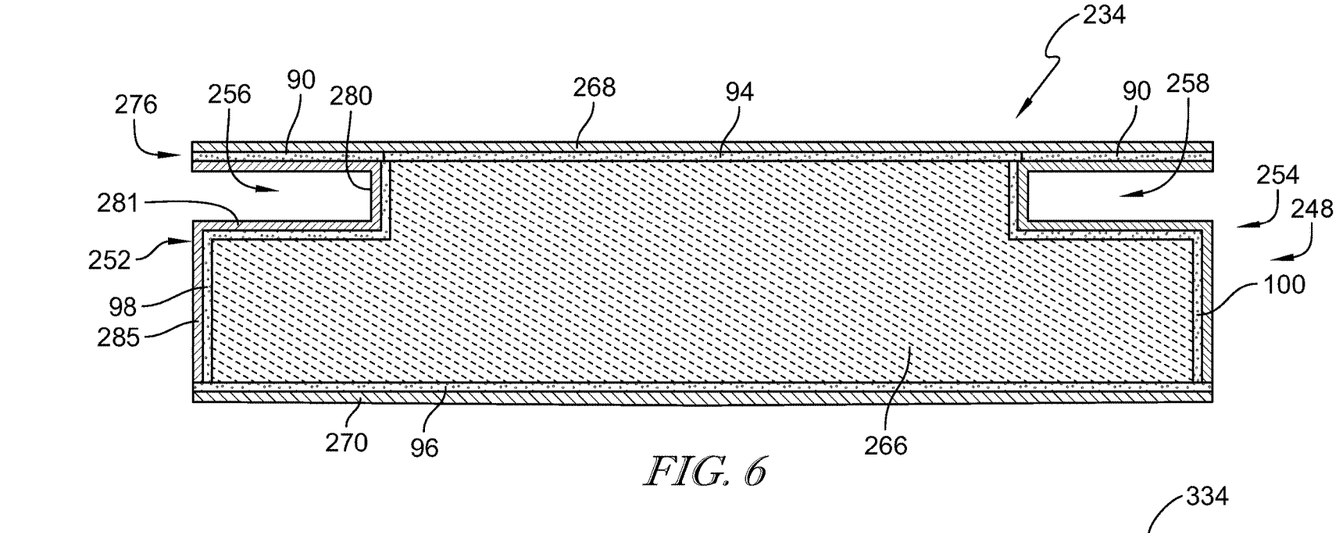
FIG. 6 is cross sectional view of a second acoustic panel that can be used with the gas turbine engine shown in FIG. 1.

Another embodiment of an acoustic panel 234 is shown in FIG. 6. The acoustic panel 234 is substantially similar to the acoustic panel 34 of FIGS. 1-5. Similar reference numbers are used to describe similar features that are common between acoustic panel 234 and acoustic panel 34. The disclosure of acoustic panel 34 is incorporated by reference herein for acoustic panel 234 except for the differences discussed below.

The acoustic panel 234 includes a panel body 248 and forward and aft support brackets 252, 254 that each include an attachment flange 276 and a panel-body support 278 as shown in FIG. 6. Each panel-body support 278 includes an outer radially extending strip 280, an outer axially-extending strip 281, and an inner radially-extending strip 285. Thus, the panel-body support 278 does not include an inner axially-extending strip.

The acoustic panel further includes a panel core 266, a radially outer skin 268, and a radially inner skin 270 as shown in FIG. 6. A plurality of adhesive layers bond each part of the acoustic panel together to form a composite acoustic panel 234. A first layer of supported adhesive 90 is positioned between the radially outer skin 268 and the attachment flanges 276. A first layer of unsupported adhesive 94 is positioned between the radially outer skin 268 and the panel core 266. A second layer of unsupported adhesive 96 is positioned between the radially inner skin 270 and the panel core 266. Layers of foamed adhesive 98, 100 are positioned between support brackets 252, 254 and the panel core 266.

Figure 7:
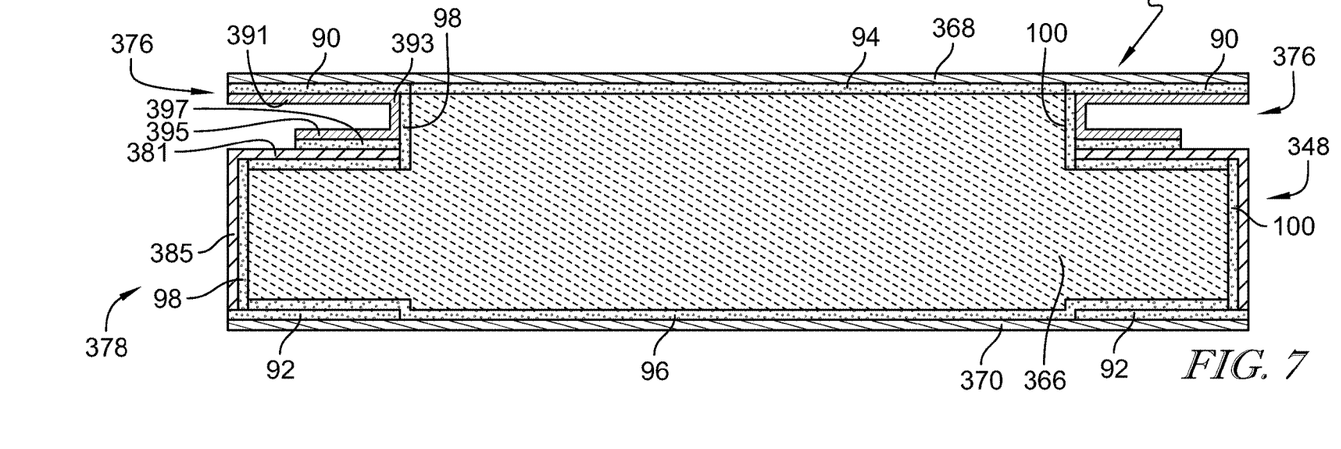
FIG. 7 is cross sectional view of a third acoustic panel that can be used with the gas turbine engine shown in FIG. 1.

Another embodiment of an acoustic panel 334 is shown in FIG. 7. The acoustic panel 334 is substantially similar to the acoustic panel 34 of FIGS. 1-5. Similar reference numbers are used to describe similar features that are common between acoustic panel 334 and acoustic panel 34. The disclosure of acoustic panel 34 is incorporated by reference herein for acoustic panel 334 except for the differences discussed below.

The acoustic panel 334 includes a panel body 348 and forward and aft support brackets 352, 354 that each include an attachment flange 376 and a panel-body support 378 as shown in FIG. 7. Each attachment flange 376 and panel-body support 378 are formed as separate components that are adhered together.

Each panel-body support 378 includes an outer axially-extending strip 381, a radially-extending strip 385, and an inner axially-extending strip 383. Thus, the panel-body support 378 does not include an outer radially-extending strip. Each attachment flange 376 includes an outer axially-extending strip 391, a radially-extending strip 393, and an inner axially-extending strip 395. The attachment flange 376 may be pre-cured prior to being assembled with the rest of the acoustic panel 334. The panel-body support 378 may be co-cured with the acoustic panel 334 after the acoustic panel 334 is assembled.

The acoustic panel further includes a panel core 366, a radially outer skin 368 coupled to the outer axially-extending strip 391, and a radially inner skin 370 coupled to inner axially-extending strip 383 as shown in FIG. 7. A plurality of adhesive layers bond each part of the acoustic panel together to form a composite acoustic panel 334. A first layer of supported adhesive 90 is positioned between the radially outer skin 368 and the attachment flanges 376. A first layer of unsupported adhesive 94 is positioned between the radially outer skin 368 and the panel core 366. A second layer of unsupported adhesive 96 is positioned between the radially inner skin 370 and the panel core 366. Layers of foamed adhesive 98, 100 are positioned between support brackets 352, 354 and the panel core 366. The outer axially-extending strip 381 of the panel-body support 378 is bonded to the inner axially-extending strip 395 by a layer of unsupported adhesive 397 positioned radially there between. Optionally, a layer of unsupported adhesive may be placed radially between the panel core 366 and the outer axially-extending strip 381 in place of foaming adhesive 98, 100. This may minimize an amount of adhesive material that flows into the cells of the panel core 366 thereby maximizing acoustic dampening capabilities of the acoustic panel 334.

Figure 8:
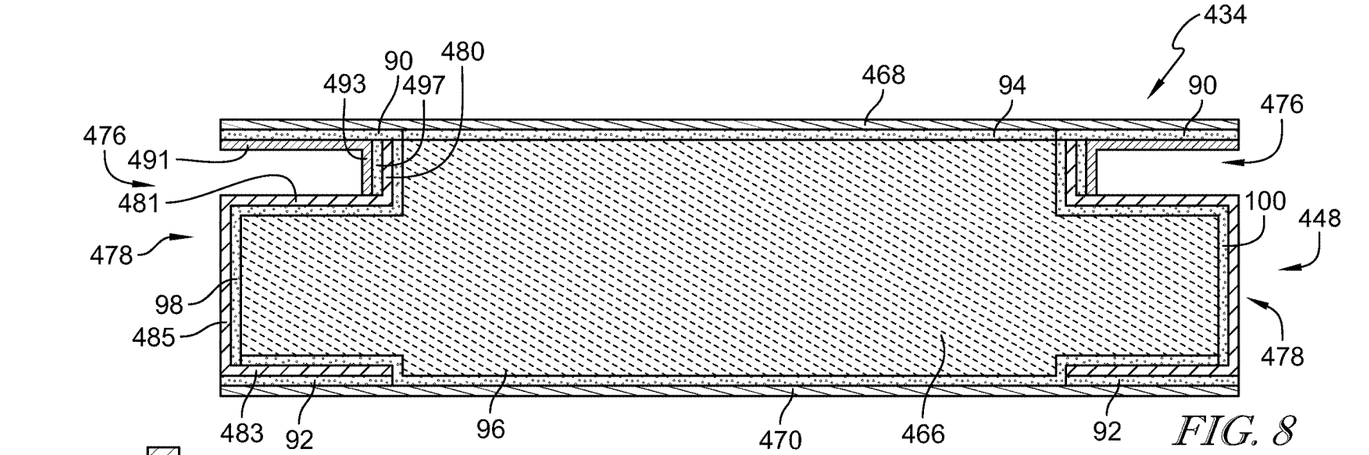
FIG. 8 is cross sectional view of a fourth acoustic panel that can be used with the gas turbine engine shown in FIG. 1.

Another embodiment of an acoustic panel 434 is shown in FIG. 8. The acoustic panel 434 is substantially similar to the acoustic panel 34 of FIGS. 1-5. Similar reference numbers are used to describe similar features that are common between acoustic panel 434 and acoustic panel 34. The disclosure of acoustic panel 34 is incorporated by reference herein for acoustic panel 434 except for the differences discussed below.

The acoustic panel 434 includes a panel body 448 and forward and aft support brackets 452, 454 that each include an attachment flange 476 and a panel-body support 478 as shown in FIG. 8. Each attachment flange 476 and panel-body support 478 are formed as separate components that are adhered together.

Each panel-body support 478 includes an outer radially-extending strip 480, an outer axially-extending strip 481, an inner radially-extending strip 485, and an inner axially-extending strip 483. Each attachment flange 476 includes an axially-extending strip 491 and a radially-extending strip 493 coupled to the outer radially-extending strip 480. The attachment flange 476 may be pre-cured prior to being assembled with the rest of the acoustic panel 434. The panel-body support 478 may be co-cured with the acoustic panel 434 after the acoustic panel 434 is assembled.

The acoustic panel further includes a panel core 466, a radially outer skin 468 coupled to the axially-extending strip 491, and a radially inner skin 470 coupled to inner axially-extending strip 483 as shown in FIG. 8. A plurality of adhesive layers bond each part of the acoustic panel together to form a composite acoustic panel 434. A first layer of supported adhesive 90 is positioned between the radially outer skin 468 and the attachment flanges 476. A second layer of supported adhesive 92 is positioned between the radially inner skin 470 and the attachment flanges 476. A first layer of unsupported adhesive 94 is positioned between the radially outer skin 468 and the panel core 466. A second layer of unsupported adhesive 96 is positioned between the radially inner skin 470 and the panel core 466. Layers of foamed adhesive 98, 100 are positioned between support brackets 452, 454 and the panel core 466. Radially-extending strip 493 of the attachment flange 476 is bonded to the outer radially-extending strip 480 of the panel-body support 478 by a layer of unsupported adhesive 497. Optionally, a layer of unsupported adhesive may be placed radially between the panel core 366 and the inner axially-extending strip 483 in place of foaming adhesive 98, 100. This may minimize an amount of adhesive material that flows into the cells of the panel core 466 thereby maximizing acoustic dampening capabilities of the acoustic panel 434.

Figure 9:
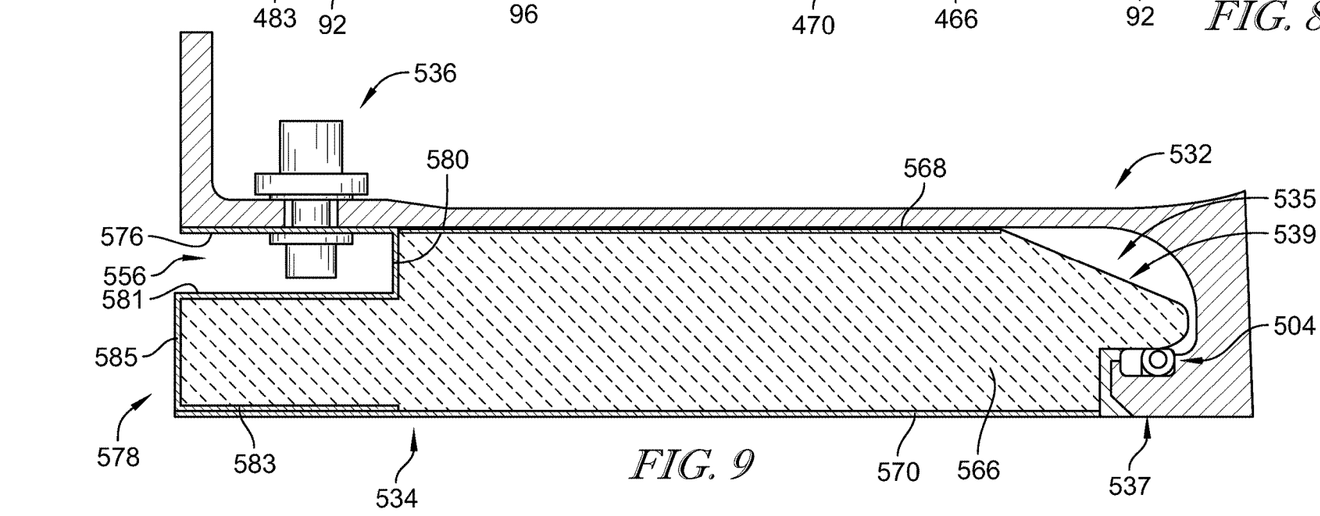
FIG. 9 is cross sectional view of another acoustic panel and another annular case that can be used with the gas turbine engine shown in FIG. 1.

Another embodiment of a fan case assembly 526 is shown in FIG. 9. The fan case assembly 526 is substantially similar to the fan case assembly 26 of FIGS. 1-5. Similar reference numbers are used to describe similar features that are common between fan case assembly 526 and fan case assembly 26. The disclosure of fan case assembly 26 is incorporated by reference herein for fan case assembly 526 except for the differences discussed below.

Fan case assembly 526 includes an annular case 532, an acoustic panel 534, and a bolting arrangement 536 as shown in FIG. 9. The annular case 532 is formed to include a channel 535 opening toward axis 18. The acoustic panel 534 is arranged to lie within the channel 535 and is secured to the annular case 532 by the bolting arrangement 536 in substantially the same manner described above with fan case assembly 26.

The annular case 532 includes an axially-extending flange 537 that extend axially forward from a portion of the annular case 532 defining the channel 535 as shown in FIG. 9. The acoustic panel 534 includes a panel body 548 and a forward support bracket 552. The forward support bracket 552 is arranged to lie at an opposite end of the channel 535 to the flange 537 such that a cavity 556 is defined radially by only the forward support bracket 552. An aft end 539 of the panel body 548 is supported radially by the flange 537 and is not retained to the annular case by the bolting arrangement 536. In this way, the acoustic panel 534 includes only the forward support bracket 552 and the bolting arrangement 536 is installed only at the forward end of the acoustic panel 534. An o-ring seal 504 may be coupled to the flange 537 and engage the aft end 539 of the acoustic panel 534 to support the panel 534. A similar arrangement may be provided between the forward end of the acoustic panel 534 and annular case 532 such that the acoustic panel includes only an aft support bracket, such as for a rear panel.

The acoustic panel 34 of the present disclosure is divided into a plurality of segments that combine to form a continuous, full-hoop panel forward the plurality of blades 28.

In some embodiments, the present disclosure includes an acoustic panel with flanges at the fore and aft of the outer skin to attach and hold riveted captured nuts. This arrangement may allow for bolting from the outer surface of the fan case and may permit the entire inner surface of the front acoustic panel (FAP) to be acoustically treated while also allowing the panel to be formed without any filler material for bolt holes, for example.

In some embodiments, a front end of the fan may include a flange that covers and hides the captured nut and pocket. This would maintain acoustic treatment while avoiding aerodynamic interruptions. The panel may include sufficient honeycomb depth between the pocket and the flowpath surface. In some embodiments, the panel's aft end may be secured by the bolting arrangement as well to avoid a lip and o-ring configuration of the annular case as shown in FIG. 9. A flap seal could be used between liners as well thereby reducing or eliminating radial flow between panels but reducing assembly cost and time for assembly. The present disclosure may provide greater serviceability options to easily remove and replace panels and may be easier to service than panels with filled access holes on the flowpath surface, for example.

In some embodiments, the panels may be used in a composite case with limited hole counts as these cases may not include hangers or other features to use to secure acoustic panels. The front acoustic panels may be relatively short (i.e. 4" to 6" long axially), so that it may not be necessary to attach the bolts at the forward most or aft most extreme of the panel to meet dynamics requirements. This would provide axial space between the bolting arrangement to the front flange or casing hook fillet of the case. The inner portion of the panel with honeycomb material may extend outward toward the annular case and may provide a seal against radial air flows.

In some embodiments, attaching the panels at their outer end reduces or eliminates interruptions to the flowpath and the need to fill any bolt holes on the flowpath side of the panel after panel installation. The present disclosure may allow the panels to be formed without potted inserts which could have a concern around torque capability. Additionally, the present disclosure allows portions of the panel radially inward of the bolting arrangement remain intact and not include any holes for attachment purposes. Holes that extend through the panel and are exposed on the flowpath side of the panel may reduce the attenuation overall and may add manufacturing complexity and cost. The panels of the illustrative embodiment include a uniform perforation inner skin and riveted captured nuts on the inside of the outer skin within the pocket(s). This may maximize acoustic treatment, visual appearance, and may provide a lightweight panel.

In some engines, there are fasteners that pass through the inner flowpath just ahead of the fan in the FAP are filled over with filler material. This requires a longer assembly process including: torqueing the bolt (which has undesirable oil lubricant), cleaning the hole, installing a foam cap, and then using a putty knife to fill the hole with a suitable filler material. The filler material could potentially cause flow disruptions if not smooth and may clog perforation holes if not properly masked. The filler material may be visually un-appealing and may lead to longer turn-around time between cleaning, masking, prepping, filling, and curing. The present disclosure avoids most or all of these issues and steps.

In some embodiments, the front and aft end of the panel may be reinforced to connect the outer skin to the inner skin. In some embodiments, compression sheet molding compound rails or laid up pre-preg ones may be used to reinforce the forward and/or aft end of the panel. Laid up pre-preg may be stronger and lighter weight but may be more labor intensive. In some embodiments, one end of the panel may be reinforced and attached from the outside using the bolting arrangement while the other end rests its lip on an o-ring or seal on the flange of the annular case. In some embodiments, the attachment provided by the bolting arrangement may retrofit into existing panel configurations using bolting through panels currently.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan case assembly adapted to extend around blades of a fan rotor included in a gas turbine engine, the fan case assembly comprising
    an annular case that extends around an axis, the annular case having an inner radial surface and an outer radial surface opposite the inner radial surface and facing away from the axis,
    an acoustic panel coupled to the annular case and configured to dampen vibrations, the acoustic panel extending circumferentially at least partway about the axis and including a panel body and a forward attachment flange, the panel body including an outer body section having a first axial length and an inner body section having a second axial length greater than the first axial length, the forward attachment flange extends axially away from the outer body section of the panel body to provide a radially intermediate surface between an outer surface of the outer body section and an inner surface of the inner body section and to form a cavity radially between the forward attachment flange and the inner body section of the panel body, and
    a bolting arrangement that couples the acoustic panel to the annular case, the bolting arrangement including a first captured nut and a first attachment fastener, the first captured nut fixed to the radially intermediate surface of the forward attachment flange and located in the cavity, and the first attachment fastener extends radially through the outer radial surface of the annular case, the inner radial surface of the annular case, through the forward attachment flange, and mates with the first captured nut in the cavity to couple the acoustic panel with the annular case.

2. The fan case assembly of claim 1, wherein the forward attachment flange has a first radial thickness and the inner body section has a second radial thickness greater than the first radial thickness.

3. The fan case assembly of claim 2, wherein the outer body section has a third radial thickness greater than the first radial thickness and equal to or less than the second radial thickness.

4. The fan case assembly of claim 1, wherein the first attachment fastener has a radially outer end positioned radially outward of the annular case and a radially inner end positioned in the cavity.

5. The fan case assembly of claim 4, wherein the inner body section is formed without any attachment through holes such that no fasteners extend through the inner body section.

6. The fan case assembly of claim 5, wherein outer body section is formed without any attachment through holes such that no fasteners extend into the outer body section.

7. The fan case assembly of claim 2, wherein the cavity is formed in a forward end of the acoustic panel and opens in an axially-forward direction.

8. The fan case assembly of claim 1, wherein the first captured nut is a riveted nutplate that is fixed to a radially inner surface of the forward attachment flange.

9. The fan case assembly of claim 1, wherein the acoustic panel further includes an aft attachment flange coupled to an aft end of the outer body section and arranged to lie radially between the annular case and the inner body section, the aft attachment flange cooperating with the inner body section to define a second cavity radially between the aft attachment flange and the inner body section and located axially aft of the outer body section, and wherein the bolting arrangement further includes a second captured nut fixed to the aft attachment flange and a second attachment fastener that extends radially through the outer radial surface of the annular case, the inner radial surface of the annular case, and into the second cavity to mate with the second captured nut.

10. The fan case assembly of claim 1, further comprising a seal positioned axially between an aft end of the inner body section and the annular case.

11. A fan case assembly adapted to extend around blades of a fan rotor included in a gas turbine engine, the fan case assembly comprising
    an annular case that extends around an axis,
    an acoustic panel coupled to the annular case and configured to dampen vibrations, the acoustic panel extending circumferentially at least partway about the axis and including a panel body and an attachment flange, the panel body including an outer body section and an inner body section, the attachment flange extends axially away from the outer body section of the panel body and is spaced apart radially from the inner body section to define a cavity radially between the attachment flange and the inner body section of the panel body, and
    a bolting arrangement that couples the acoustic panel to the annular case, the bolting arrangement including a first captured nut and a first attachment fastener, the first captured nut positioned between the attachment flange and the inner body section in the cavity, and the first attachment fastener extends radially through the annular case, through the attachment flange, and mates with the first captured nut in the cavity to couple the acoustic panel with the annular case.

12. The fan case assembly of claim 11, wherein the attachment flange has a first radial thickness and the inner body section has a second radial thickness greater than the first radial thickness.

13. The fan case assembly of claim 12, wherein the outer body section has a third radial thickness greater than the first radial thickness and equal to or less than the second radial thickness.

14. The fan case assembly of claim 11, wherein first attachment fastener has a radially outer end positioned radially outward of the annular case and a radially inner end positioned in the cavity.

15. The fan case assembly of claim 14, wherein the inner body section is formed without any attachment through holes such that no fasteners extend through the inner body section.

16. The fan case assembly of claim 15, wherein the outer body section is formed without any attachment through holes such that no fasteners extend into the outer body section.

17. The fan case assembly of claim 11, wherein the cavity is formed in a forward end of the acoustic panel and opens in an axially-forward direction.

18. The fan case assembly of claim 11, wherein the first captured nut is a riveted nutplate that is fixed to a radially inner surface of the attachment flange.

19. The fan case assembly of claim 11, wherein the attachment flange is a forward attachment flange coupled to a forward end of the outer body section and the acoustic panel further includes an aft attachment flange coupled to an aft end of the outer body section and arranged to lie radially between the annular case and the inner body section, the aft attachment flange cooperating with the inner body section to define a second cavity radially between the aft attachment flange and the inner body section and located axially aft of outer body section, and wherein the bolting arrangement further includes a second captured nut fixed to the aft attachment flange and a second attachment fastener that extends radially through the outer radial surface of the annular case, the inner radial surface of the annular case, and into the second cavity to mate with the second captured nut.

20. The fan case assembly of claim 1, further comprising a seal positioned axially between an aft end of the inner body section and the annular case.

\* \* \* \* \*